United States Patent
Peeler et al.

(10) Patent No.: US 9,319,150 B2
(45) Date of Patent: Apr. 19, 2016

(54) REDUCTION OF HAPTIC NOISE FEEDBACK IN SYSTEM

(71) Applicants: Douglas J. Peeler, Austin, TX (US); Richard W. Schuckle, Austin, TX (US)

(72) Inventors: Douglas J. Peeler, Austin, TX (US); Richard W. Schuckle, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 567 days.

(21) Appl. No.: 13/662,922

(22) Filed: Oct. 29, 2012

(65) Prior Publication Data

US 2014/0119569 A1    May 1, 2014

(51) Int. Cl.
*H04B 15/00* (2006.01)
*F16F 15/00* (2006.01)

(52) U.S. Cl.
CPC .............. *H04B 15/00* (2013.01); *F16F 15/00* (2013.01)

(58) Field of Classification Search
CPC ................ G10L 21/0208; G10L 2021/02085; G10L 2021/02087; G10L 2021/02061
USPC ................... 381/92, 94.1–94.7; 704/226, 232
See application file for complete search history.

(56) References Cited

U.S. PATENT DOCUMENTS

| | | | | |
|---|---|---|---|---|
| 5,243,661 A * | 9/1993 | Ohkubo et al. | ............. | 381/94.2 |
| 5,917,921 A * | 6/1999 | Sasaki et al. | ................. | 381/94.1 |
| 6,959,276 B2 * | 10/2005 | Droppo | ................... | G10L 15/20 |
| | | | | 379/406.01 |
| 7,433,475 B2 * | 10/2008 | Wakui | ........................ | 381/94.1 |
| 7,761,204 B2 | 7/2010 | König | | |
| 8,641,595 B2 * | 2/2014 | Basinger | ............ | A61N 1/36032 |
| | | | | 381/312 |
| 2005/0234715 A1 * | 10/2005 | Ozawa | ......................... | 704/226 |
| 2007/0079206 A1 * | 4/2007 | Arora | ...................... | G06F 3/038 |
| | | | | 714/745 |
| 2008/0187148 A1 * | 8/2008 | Itabashi | ............... | G10K 11/178 |
| | | | | 381/71.6 |
| 2009/0136052 A1 * | 5/2009 | Hohlfeld | ............ | G10K 11/1788 |
| | | | | 381/71.1 |
| 2010/0267424 A1 * | 10/2010 | Kim | ........................ | G06F 3/016 |
| | | | | 455/566 |
| 2011/0111806 A1 | 5/2011 | Kim et al. | | |
| 2011/0129096 A1 * | 6/2011 | Raftery | .............. | G10K 11/1782 |
| | | | | 381/66 |
| 2011/0223997 A1 | 9/2011 | Mao | | |
| 2013/0272532 A1 * | 10/2013 | Mazanec | .............. | H04R 25/305 |
| | | | | 381/60 |

* cited by examiner

*Primary Examiner* — Disler Paul
(74) *Attorney, Agent, or Firm* — Larson Newman, LLP (57) ABSTRACT

An information handling system has a haptic generation module to generate haptic effects including haptic noise and a haptic noise reduction module. The haptic noise reduction module receives characteristics of sound representative of haptic noise generated by a haptic generation module of a device and entering an audio input module of the device, the characteristics including frequencies and timing. It also detects the generation of haptic effects, the generations occurring after the receiving characteristics. It also reduces the effects of haptic noise on digital data representing audio input to the device based upon the received characteristics of the sound. It may reduce the effects by subtracting amplitudes of audio waves representing the haptic noise from amplitudes of audio waves representing the audio input.

14 Claims, 5 Drawing Sheets

REDUCTION OF HAPTIC NOISE FEEDBACK IN SYSTEM

FIELD OF THE DISCLOSURE

The present disclosure generally relates to information handling systems, and more particularly relates to a reduction of feedback from haptic noise.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can produce haptic effects to enhance user experience.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
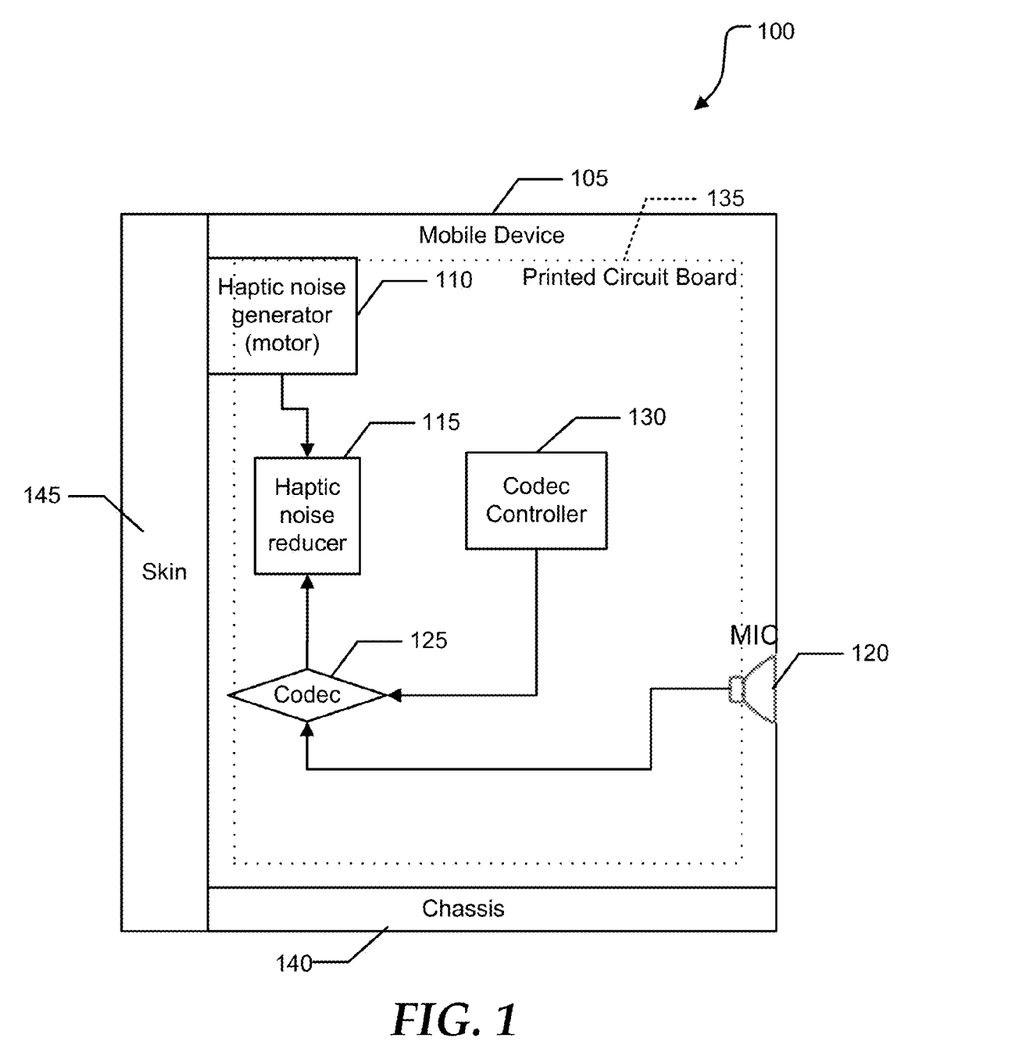
FIG. 1 is a block diagram of a mobile device according to an embodiment of the present disclosure.

FIG. 1 illustrates an information handling system such as a mobile device 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. An information handling system may generate haptic effects to enhance a user's experience.

In a particular embodiment, mobile device 100 includes haptic noise generator 110, haptic noise reducer 115, microphone 120, coder/decoder (codec) 125, controller 130, printed circuit board 135, chassis 140, and skin 145. Haptic noise generator 110 may generate noise during the production of haptic effects. Haptic is a tactile feedback technology that may utilize a user's sense of touch by applying forces, vibrations, or motions to the user to enhance the user's experience with a computing device. The effects may provide notice to a user. A cellular telephone may, for example, produce vibrations to alert a user to an incoming call when the ring tone is disabled. The effects may also provide feedback to the user of the device. The device may, for example, produce a sensation of resistance and movement when a user touches keys displayed on a flat surface. The sensation may be caused by the production of vibrations or by an actual change in the shape of the surface. As a result, the user has the sensation of depressing the keys and may be better able to control typing. In this case, the noise production may be an after-effect of the production of the sensation, rather than the goal of the haptic generation. There may be some variance in the production of haptic noise by haptic noise generator 110. An application may control the frequency or the duration of haptic noise generation, or both. A frequency for haptic noise generation may, for example, be input with the on-switch. Thus, separate applications may generate haptic noise at separate frequencies.

Haptic effects may be produced by a variety of mechanisms. Haptic noise may be generated electrically, mechanically, or by other methods known in the art. A transducer converts electrical current directly into sound by sending current through a piezo-electric crystal, causing changes to its shape under the piezoelectric effect. As a result, the crystal emits a sound. To produce sound mechanically, a motor may move a weight back and forth, thereby producing vibrations. In some embodiments, haptic noise generator 110 may move skin 145 back and forth. Skin 145 may consequently act like a speaker, producing outward-directed sound waves. In other embodiments, haptic noise generator 110 may change the shape of skin 145 by applying pressure to it.

Microphone 120 may receive sound waves and convert them into electrical waves. The sound waves may produce vibrations in a diaphragm, a thin plate contained in the microphone; and the vibrations of the diaphragm may induce electrical signals. These electrical signals may be transmitted to codec 125, which converts the electrical waves to digital forms. Codec 125 may measure the electrical signals produced by the microphone at a predetermined frequency ('sample' the signals), divide the amplitudes of the waves into ranges, and record the ranges. Some of these frequencies may be in the range of ordinary speech. The result may be, for each sample period and each sample range, a value of an amplitude of frequencies in the range during the period. Codec controller is connected to, and controlled by, codec controller 130.

The sound received by microphone 120 may include haptic noise. In some embodiments, microphone 120 may directly pick up haptic noise generated by haptic noise generator 110 and transmitted to a user. Microphone 120 may, for example, be a two-way microphone capable of picking up sound transmitted from mobile device 100 to a user as well as sound sent into mobile device 100. Microphone 120 may also pick up haptic noise by its transmission through the physical components of mobile device 100, such as printed circuit board 135, chassis 140, and skin 145. Sound travelling through these components may cause vibrations in the diaphragm of microphone 120, which are then converted to electrical signals.

The haptic noise picked up by microphone 120 may interfere with audio communications by mobile device 100. A user may, for example, issue voice commands to a voice-activated subsystem of mobile device 100 or may speak into microphone 120 to carry on a voice communication with another party. In either case, the haptic noise picked up by microphone 120 may interfere with the intended audio communications.

Haptic noise reducer 115 may attempt to reduce or cancel noise produced by haptic noise generator 110. In the embodiment of FIG. 1, haptic noise reducer 115 is connected to haptic noise generator 110 and codec 125. Haptic noise reducer 115 may receive notice from haptic noise generator 110 that it has instituted the production of haptic noise. It may then receive from codec 125 a digital representation of sound input into microphone 120. Haptic noise reducer 115 may then process the digital representation to attempt to remove the haptic noise. The processing may be based upon characteristics of the haptic noise that is produced by haptic noise generator 100 and that enters microphone 120 or another audio subsystem of mobile device 100. The characteristics may include frequencies, amplitudes, and timing. As with the sound input, the characteristics of haptic noise may be represented by digital data representing amplitudes of the noise at the sample periods.

In some embodiments, determining the characteristics may be based upon a model of haptic noise generator 100. The model may take into consideration the mechanical and structural components of haptic noise generator 110 and mobile device 100, such as printed circuit board 135, chassis 140, and skin 145. The model may take into account the transmission of haptic noise through the physical components of mobile device 100. Applying the model may result in determining frequencies, amplitudes, and timing of haptic noise generated by haptic noise generator 110 and entering microphone 120. In other embodiments, determining the characteristics of the haptic noise that is produced by haptic noise generator 110 may be based upon experimentation. The haptic noise for the device may, for example, be generated in a quiet environment and amplitudes of peak frequencies measured. Thus, the haptic noise may be characterized by digital data representing the noise. The haptic noise may, for example, be characterized by determining that it produces a peak of sound around a frequency of 2 kilohertz and measuring amplitudes of sound at that frequency. The experiment may be performed upon each unit or upon a sample of units. In the latter case, the calibration of the haptic noise reducer 115 may be based upon an average unit. For example, some units of a particular model may be tested and the results generalized over all units of the model. As another example, tests may be performed over models of a group of similar models, and the results generalized over all units of the group of models.

Once haptic noise reducer 115 has received digital data representing sound input into microphone 120, notice that haptic noise is being produced, and characteristics of the haptic noise, haptic noise reducer 115 may attempt to remove the haptic noise from the digital data or otherwise reduce the effects of the haptic noise. In some embodiments, haptic noise reducer 115 may attempt to eliminate haptic frequencies and their overtones from the output of codec 125. Such an approach may represented by the following equation:

$$\text{Output}_{audio} = \text{Input}_{audio} - F_{reduction}(\text{Freq}_{haptic}) \quad (1)$$

where F represents a frequency or frequencies to be subtracted from the audio input. As indicated by the equation, haptic noise reducer 115 may operate on the digital data produced by codec 125 by subtracting from it the digital data representing the haptic noise. The subtraction may be performed by subtracting amplitudes representing the haptic noise from amplitudes representing the sound input. In some embodiments, the digital values representing ranges of amplitudes for the audio input may be converted into actual amplitudes, and the amplitudes representing the haptics noise may be subtracted. A value representing a range may be converted, for example, into the midpoint of the range, the geometric mean of the minimum and maximum values for the range, or some other value within the range.

In many embodiments, the subtracted amplitudes representing the haptic noise may be the actual amplitudes of the digital data representing the haptic noise. In other embodiments, however, haptic noise reducer 115 may subtract from the digital data representing the sound input amplitudes different than the actual amplitudes of the digital data representing the haptic noise. This procedure may be based upon a model that determines that the combination of sound sources is not necessarily linear. In several embodiments, haptic noise reducer 115 may eliminate haptic frequencies and their overtones from frequencies outside of the normal speaking range and leave unchanged the output of codec 125 in the normal speaking range. In a few embodiments, haptic noise reducer 115 may take the opposite approach, attempting to remove haptic noise from frequencies in the normal speaking range and leaving unchanged frequencies outside the normal speaking range.

To perform the subtraction, haptic noise reducer 115 may have to synchronize the digital data and the data representing characteristics of the haptic noise, determining which amplitudes of the haptic noise characteristics correspond to which amplitudes of the digital data. In some embodiments, haptic noise reducer 115 may assume that the haptic noise generator 110 acts instantaneously. For practical purposes, it may not begin counteracting the haptic noise until it has already been generated, or for practical purposes, the generation may be nearly instantaneous. In other embodiments, a lag between the notice and the operation of haptic noise reducer 115 may be programmed in. The lag time may be based on a duration between the beginning of the generation of haptic noise and its transmittal through components of mobile device 100 to microphone 120.

In further embodiments, different types of haptic noise may be generated depending on the circumstances. Some applications may generate one type of haptic noise and other applications may generate another type of haptic noise. Alternatively, an application may generate different kinds of haptic noise for different purposes. In these further embodiments, the characteristics of each type of haptic noise may be determined. Haptic noise reducer 110 may receive notice from haptic noise generator 110 both of the start of generation of haptic noise and of the type of haptic noise being generated. Haptic noise reducer 110 may attempt to remove the particular type of haptic noise being generated from the audio input. It may, for example, subtract amplitudes representing the particular type of haptic noise from the amplitudes of the digital data.

In other embodiments, a haptic noise reducer may receive a signal that haptic noise generation has begun from a module other than the haptic noise generator. A module that signals the haptic noise generator to begin may, for example, also signal the haptic noise reducer. In many embodiments, haptic noise reducer may be combined with codec controller 130. In those embodiments, codec controller 130 may be notified that haptic noise generation has been instituted and may modify the operation of codec 125 to reduce haptic noise. In still other embodiments, information-handling systems other than mobile devices, such as desktops and laptops, may produce haptic effects and may reduce their effect upon sound input to the system by integrating the sound input system and the haptic noise generator. In many embodiments, a sound intake subsystem may consist of multiple microphones.

In a few embodiments, the codec and the haptics noise reducer may be combined. In some of these embodiments, amplitudes representing the haptics noise may be directly subtracted from amplitudes representing the audio input. The difference may then be converted into the ranges of digital data.

Figure 2:
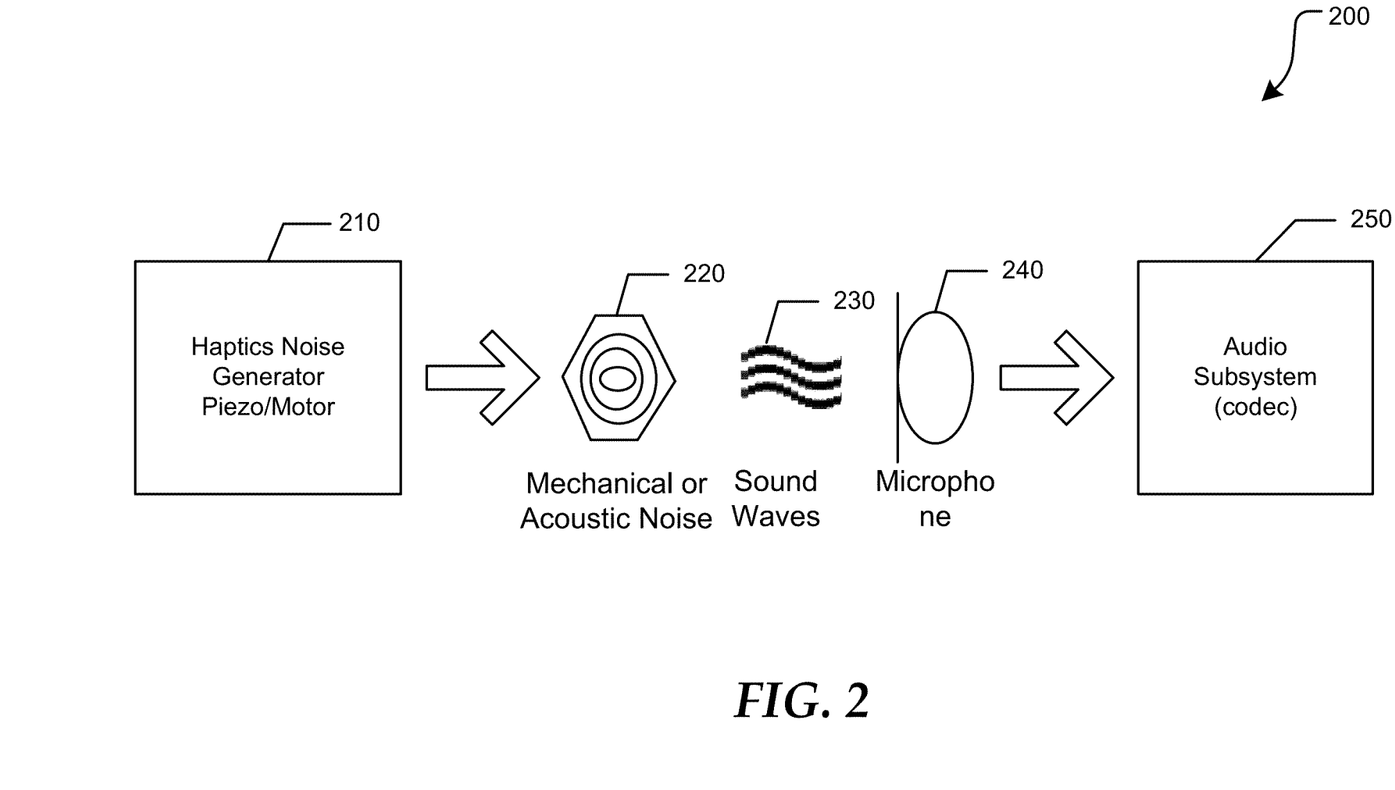
FIG. 2 is a flow chart illustrating the production of sound that enters an audio subsystem according to an embodiment of the present disclosure.

FIG. 2 illustrates the production of sound 200 entering an audio subsystem according to an embodiment of the present disclosure. The sound may be produced by a system such as mobile device 100 of FIG. 1. The sound production includes haptic noise generation by haptic noise generator 210. Haptic noise generator 210 may produce noise 220 mechanically, by a motor, or electrically, through the piezo/electric effect. The production of noise may be the end goal of the haptic effects generation, or may be the side effect of some other effect, such as changing the texture of a touch screen or offering resistance to the touch of the user. Noise 220 combines with the sound represented by sound waves 230. These sound waves may represent user speech, either for transmission to another user or for commands to a computing device, or other sound intended as input to a computing device. The combined sound may be received by microphone 240 and transformed by a codec such as codec 125 of FIG. 1 into digital data. The noise 220 may interfere with the sound represented by sound waves 230. A person or system receiving the combined sound may be unable to separate out or otherwise determine the sound waves 230. In such a case, it may be desirable to reduce the effects of the haptic noise by integrating its production with the audio subsystem 250.

Figure 3:
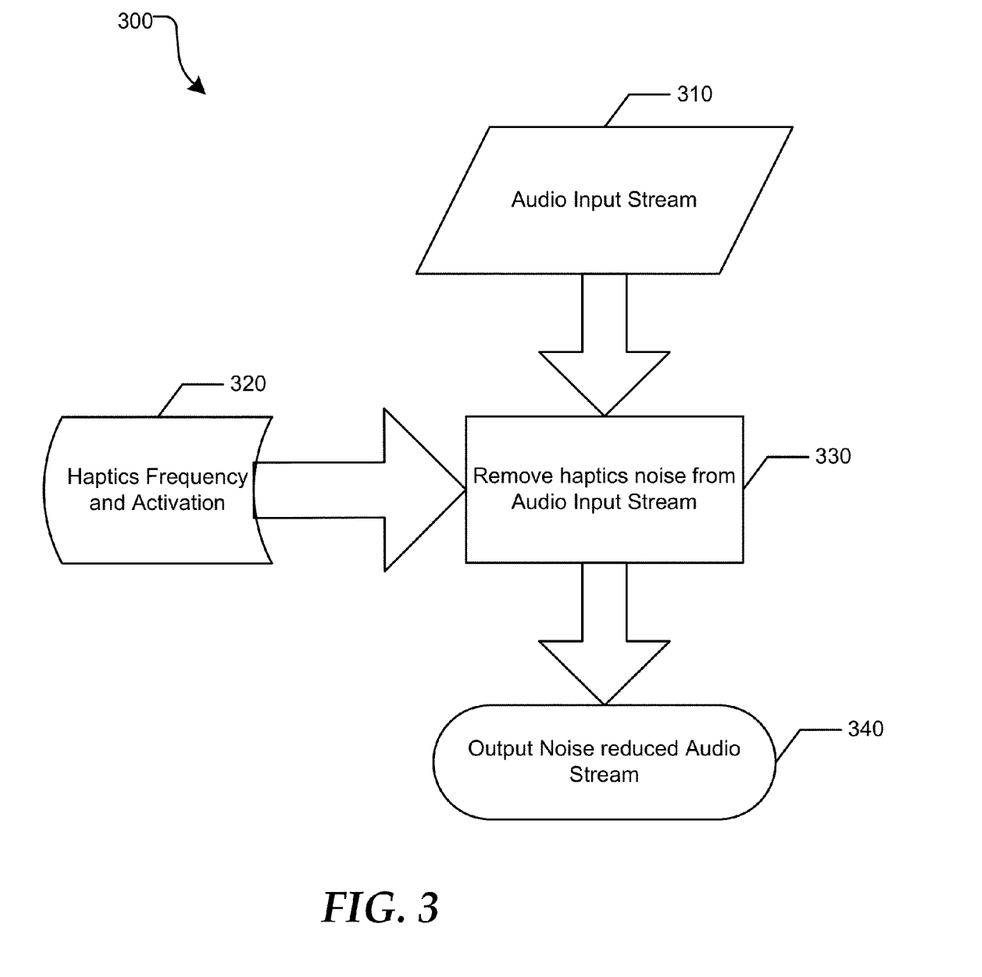
FIG. 3 is a flow chart illustrating the removal of haptic noise from an audio input stream according to an embodiment of the present disclosure.

FIG. 3 illustrates the removal of haptic noise from an audio input stream according to an embodiment of the present disclosure. The haptic noise may be generated by a system such as mobile device 100 of FIG. 1 by a process such as that illustrated in FIG. 2. In FIG. 3, input to a component such as haptic noise reducer 115 of FIG. 1 may include sound from an audio input stream 310. The audio stream may be generated by a combination of haptic noise and speech or other user input to a sound system of a device. The input may also include data about haptic frequency and activation 320. This data may represent notice to a haptic noise reducer of the activation of haptic noise and data about the frequencies and amplitudes of the resultant haptic noise. In many embodiments, the data about the haptic noise may be in the form of digital data. At block 330, the haptic noise reducer may remove the haptic noise from the digital stream or otherwise reduce the effects of the haptic noise. The reduction may be implemented by subtracting the amplitudes of the digital data representing the haptic noise from the amplitudes of the digital data representing the audio input stream. As a result of the subtraction of the haptic noise from the audio stream, at block 340 the system may output an audio stream with the haptic noise reduced.

Figure 4:
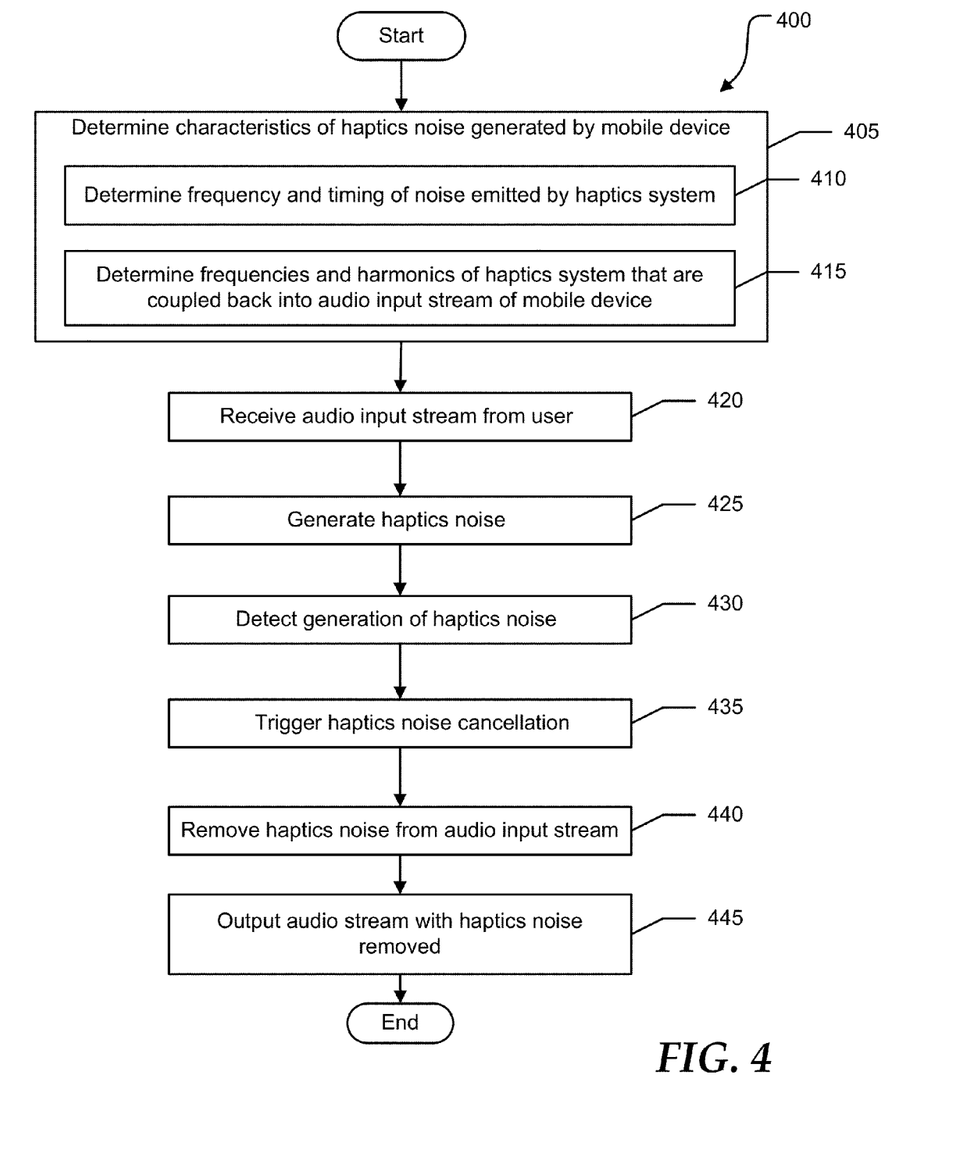
FIG. 4 is a flow chart illustrating the removal of haptic noise from an audio input stream according to another embodiment of the present disclosure.

FIG. 4 shows a method 400 for the removal of haptic noise from an audio input stream. Method 400 begins at block 405 with determining characteristics of haptic noise generated by a mobile device or other information handling system. The determination includes the determination of the frequency and timing of noise emitted by haptic system at block 410. A vibration to notify a user may occur periodically, for example, as a series of pulses. Information gathered about the haptic noise may include the period of the vibration. In some cases, if different types of haptic noise are generated in different circumstances, the information may include information about the various types of noises. The determination also includes an identification of the frequencies and harmonics of the haptic system that are coupled back into audio input stream of the mobile device. The haptic noise heard by a user may differ from the haptic noise that is coupled back to the audio input stream. The noise may be transmitted to a user by a different mechanism than transmitted to the audio input. Some haptic noise may, for example, flow through physical components of a mobile device or other information handling system into the audio subsystem. The haptic noise may be transmitted to a user through the air or through earphones. In many embodiments, the characteristics of the haptic noise may be represented digitally, as amplitudes of the noise at a series of sampling points.

The mobile device or other information handling system receives an audio input stream from the user at block 420. The user may be speaking for transmission to another user at another mobile device, issuing a voice command, or otherwise generating sound for capture by the mobile device. The user may, for example, be recording music or sound effects for a movie. The mobile device or other information handling system may also generate haptic noise. The generation may provide notice to a user or enable the user to better interact with the user interface of the mobile device. At block 430, the generation of haptic noise may be detected. In some embodiments, the detection may be as a result of the integration of the haptic noise generation system and the audio input system. The haptic noise generation module may notify a haptic noise reduction module of the start of haptic noise generation, or a module that instructs the haptic noise generation module to begin the generation of haptic noise may also notify the haptic noise reduction module. In other embodiments, the detection may be as the result of an acoustic trigger. A component of the mobile device or other information handling system may recognize the acoustic signature of the haptic noise and look for that acoustic signature. In some embodiments, where a haptic noise generator such as haptic noise generator 110 of FIG. 1 produces multiple types of haptic noise, the component may recognize multiple acoustic signatures of haptic noise.

The detection of the start of haptic noise generation may trigger haptic noise cancellation or reduction at block 435. The cancellation or reduction may be performed by a module such as haptic noise reducer 115 of FIG. 1. The cancellation may begin immediately with the detection or the cancellation may occur after a lag. The lag may be calculated to allow haptic noise time to flow through components of a mobile device or other information handling system to a microphone and be converted to electrical waves and digital data. At block 440, the haptic noise is removed from the audio input stream. In some embodiments, the frequencies and amplitudes representing the haptic noise and its overtones may be subtracted from the audio input stream. At step 445, the audio stream with haptic noise removed may be output. It may, for example, be transmitted to a user at another mobile device or input into a voice command subsystem.

The method of FIG. 4 may enable the reduction or cancellation of haptic noise without the need for a general-purpose noise-cancelling device. The general-purpose device may listen to sounds input to an information-handling system, may distinguish between noise and legitimate input, and may try to cancel some of the noise. Such a device requires a component to detect the haptic noise, recognize it as noise, and base the cancellation on the detected noise. In contrast, in some embodiments of FIG. 4, haptic noise may be cancelled without listening for it. Instead, a haptic noise reduction module is notified when the production of haptic noise is instituted and can start cancelling the noise without actually listening for it. In particular, the method of FIG. 4 may enable the cancellation of haptic noise without the need for a separate microphone to capture background noise.

Other embodiments of FIG. 4 may operate with a special purpose noise detector to recognize the acoustic signature of the haptic noise. Once recognized, the haptic noise reduction module may begin operation to cancel or otherwise reduce the noise. Some of these embodiments may enable the reduction or elimination of haptic noise without recognition of the full pattern of the noise. Instead, once an acoustic signature of the noise is recognized, the haptic noise removal system is triggered and can operate based upon the pre-determined characteristics of the noise, without a need to produce a complete digital representation of the currently generated noise. In both of these embodiments, cancellation of haptic noise can be performed with greater accuracy, because data about the noise to be cancelled has been obtained in advance and may be obtained more accurately than can be obtained by the sound-detection portion of a general purpose noise-reduction device.

The method of FIG. 4 may also improve the operation of many mobile devices and other information-handling systems that combine haptic generation and voice input. As the use of voice over Internet Protocol (VOIP) and voice recognition grows, the opportunity for haptic feedback during voice input has a larger potential to occur and may affect the quality and ability to recognize the input audio stream properly. Some embodiments of FIG. 4 may enable a mobile device or other information-handling system to remove the haptic noise before it is streamed or processed into the audio output, thereby providing the best user experience possible without limiting the capabilities of the platform. In particular, in a few embodiments, the method of FIG. 4 may avoid a tradeoff between a level of haptic noise sufficient to alert a user and a level low enough not to interfere with voice input to the system.

Figure 5:
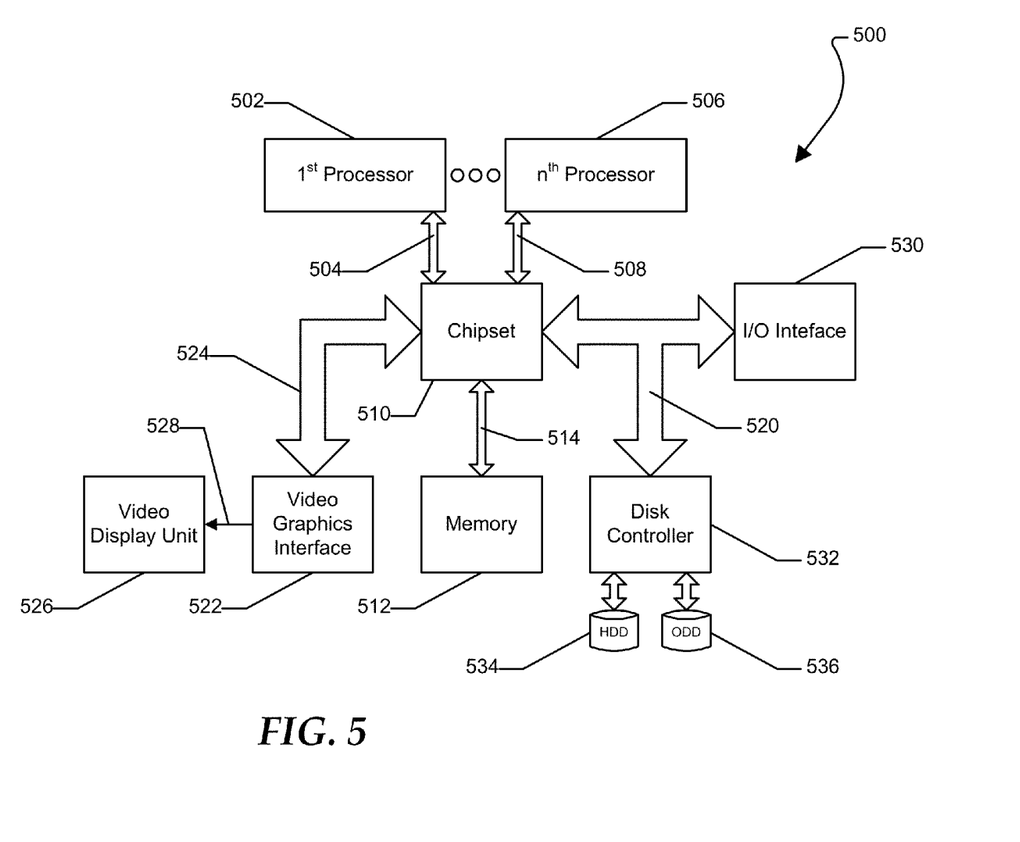
FIG. 5 is a block diagram illustrating an information handling system according to an embodiment of the present disclosure.

FIG. 5 is a block diagram illustrating an embodiment of an information handling system 500, including a first physical processor 502 coupled to a first host bus 504 and can further include additional processors generally designated as nth physical processor 506 coupled to a second host bus 508. The first physical processor 502 can be coupled to a chipset 510 via the first host bus 504. Further, the nth physical processor 506 can be coupled to the chipset 510 via the second host bus 508. The chipset 510 can support multiple processors and can allow for simultaneous processing of multiple processors and support the exchange of information within information handling system 500 during multiple processing operations.

According to one aspect, the chipset 510 can be referred to as a memory hub or a memory controller. For example, the chipset 510 can include an Accelerated Hub Architecture (AHA) that uses a dedicated bus to transfer data between first physical processor 502 and the nth physical processor 506. For example, the chipset 510, including an AHA enabled-chipset, can include a memory controller hub and an input/output (I/O) controller hub. As a memory controller hub, the chipset 510 can function to provide access to first physical processor 502 using first bus 504 and nth physical processor 506 using the second host bus 508. The chipset 510 can also provide a memory interface for accessing memory 512 using a memory bus 514. In a particular embodiment, the buses 504, 508, and 514 can be individual buses or part of the same bus. The chipset 510 can also provide bus control and can handle transfers between the buses 504, 508, and 514.

According to another aspect, the chipset 510 can be generally considered an application specific chipset that provides connectivity to various buses, and integrates other system functions. For example, the chipset 510 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 510. The chipset 510 can also be packaged as an application specific integrated circuit (ASIC).

The information handling system 500 can also include a video graphics interface 522 that can be coupled to the chipset 510 using a third host bus 524. In one form, the video graphics interface 522 can be an Accelerated Graphics Port (AGP) interface to display content within a video display unit 526. Other graphics interfaces may also be used. The video graphics interface 522 can provide a video display output 528 to the video display unit 526. The video display unit 526 can include one or more types of video displays such as a flat panel display (FPD) or other type of display device.

The information handling system 500 can also include an I/O interface 530 that can be connected via an I/O bus 520 to the chipset 510. The I/O interface 530 and I/O bus 520 can include industry standard buses or proprietary buses and respective interfaces or controllers. For example, the I/O bus 520 can also include a Peripheral Component Interconnect (PCI) bus or a high speed PCI-Express bus. In one embodiment, a PCI bus can be operated at approximately 66 MHz and a PCI-Express bus can be operated at more than one speed, such as 2.5 GHz and 5 GHz. PCI buses and PCI-Express buses can be provided to comply with industry standards for connecting and communicating between various PCI-enabled hardware devices. Other buses can also be provided in association with, or independent of, the I/O bus 520 including, but not limited to, industry standard buses or proprietary buses, such as Industry Standard Architecture (ISA), Small Computer Serial Interface (SCSI), Inter-Integrated Circuit (I2C), System Packet Interface (SPI), or Universal Serial buses (USBs).

In an alternate embodiment, the chipset 510 can be a chipset employing a Northbridge/Southbridge chipset configuration (not illustrated). For example, a Northbridge portion of the chipset 510 can communicate with the first physical processor 502 and can control interaction with the memory 512, the I/O bus 520 that can be operable as a PCI bus, and activities for the video graphics interface 522. The Northbridge portion can also communicate with the first physical processor 502 using first bus 504 and the second bus 508 coupled to the nth physical processor 506. The chipset 510 can also include a Southbridge portion (not illustrated) of the chipset 510 and can handle I/O functions of the chipset 510. The Southbridge portion can manage the basic forms of I/O such as Universal Serial Bus (USB), serial I/O, audio outputs, Integrated Drive Electronics (IDE), and ISA I/O for the information handling system 500.

The information handling system 500 can further include a disk controller 532 coupled to the I/O bus 520, and connecting one or more internal disk drives such as a hard disk drive (HDD) 534 and an optical disk drive (ODD) 536 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail herein, those skilled in the art will readily appreciate that many modifications are possible in the exemplary embodiments without materially departing from the novel teachings and advantages of the embodiments of the present disclosure. For example, the methods described in the present disclosure can be stored as instructions in a computer readable medium to cause a processor, such as chipset 510, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an infatuation handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a haptic generation module to generate haptic effects including haptic noise; and
    an audio input module to capture audio input and to produce digital data representing the audio input, including:
        a haptic noise reduction module to:
            receive characteristics of sound representative of haptic noise entering the audio input module, the characteristics including frequencies and pulse periods;
            detect generations of haptic effects, the generations occurring after the characteristics are received;
            reduce effects of haptic noise on the digital data based upon the received characteristics of the sound; and
            wherein the detection comprises the haptic noise reduction module receiving notice of the generation of haptic effects;
        the haptic generation module generating haptic effects including haptic noise comprises the haptic generation module generating a first type of haptic noise and a second type of haptic noise;
        the haptic noise reduction module receiving characteristics of sound comprises the haptic noise reduction module receiving characteristics of sound representative of the first type of haptic noise and the second type of haptic noise; and
        the haptic noise reduction module receiving notice of the generation of haptic effects comprises the haptic noise reduction module receiving notice of the generation of haptic effects and notice of which of the two types of haptic noise is being generated.

2. The information handling system of claim 1 wherein the detection comprises the haptic noise reduction module receiving notice from the haptic generation module of the generation of haptic effects.

3. The information handling system of claim 1 wherein:
    a haptic command module is to command the haptic generation module to commence the generation of haptic effects; and
    the detection comprises the haptic noise reduction module receiving notice from the haptic command module of the generation of haptic effects.

4. The information handling system of claim 1 wherein:
    the information handling system comprises:
        a codec to convert electrical impulses representing the audio input into digital data; and
        a codec controller to control the codec; and
    the reducing effects of haptic noise comprises the codec controller issuing commands to the codec.

5. The information handling system of claim 1 wherein:
the audio input module comprises a haptic noise recognition module to recognize a characteristic signature of the haptic noise generated by the haptic generation module; and the haptic noise recognition module is to notify the haptic noise reduction module on the generation of haptic noise.

6. A method comprising:
determining characteristics of haptic noise generated by a haptic generation component of a computing device and entering an audio input module of the computing device, the characteristics including frequencies and pulse periods;

receiving an audio input stream after receiving the characteristics;

generating haptic noise;

detecting generation of haptic effects after receiving the characteristics wherein the detecting includes receiving notice of the generation of haptic effects; and reducing effects of the haptic noise on digital data representing the audio input stream based upon the characteristics of the haptic noise, wherein;

the determining comprises determining characteristics of a first type of haptic noise and a second type of haptic noise;

the detecting comprises identifying a type of the generated haptic noise as the first type of haptic noise or the second type of haptic noise; and the reducing comprises reducing effects of haptic noise on the digital data based upon the characteristics of the identified type of haptic noise.

7. The method of claim 6 wherein the determining characteristics comprises determining characteristics experimentally.

8. The method of claim 7 wherein the determining characteristics experimentally comprises performing experiments on other computing devices similar to the computing device and not performing experiments on the computing device.

9. The method of claim 6 wherein the determining characteristics comprises determining characteristics based on modeling the traversal of haptic noise through the computing device into the audio input of the computing device.

10. The method of claim 9 wherein the modeling comprises modeling a traversal of haptic noise through a chassis of the computing device and through a printed circuit board of the computing device.

11. The method of claim 9 wherein:
the audio input module of the computing device includes an omni-directional microphone; and
the modeling comprises modeling the omni-directional microphone capturing haptic noise directed to a user, the captured haptic noise thereby entering the audio input module.

12. The method of claim 11 wherein the modeling further comprises modeling a traversal of haptic noise through a chassis of the computing device and through a printed circuit board of the computing device.

13. The method of claim 6 wherein the reducing comprises differentiating between haptic noise in a range of voice frequency and haptic noise outside of the range of voice frequency.

14. The method of claim 6 wherein the generating is deliberately generating haptic effects in order to provide notice or feedback to a user of the computing device to the user.

* * * * *